Jan. 14, 1930.  D'ORSAY McC. WHITE  1,743,644
MANUFACTURE OF WHEELS
Filed Oct. 14, 1925
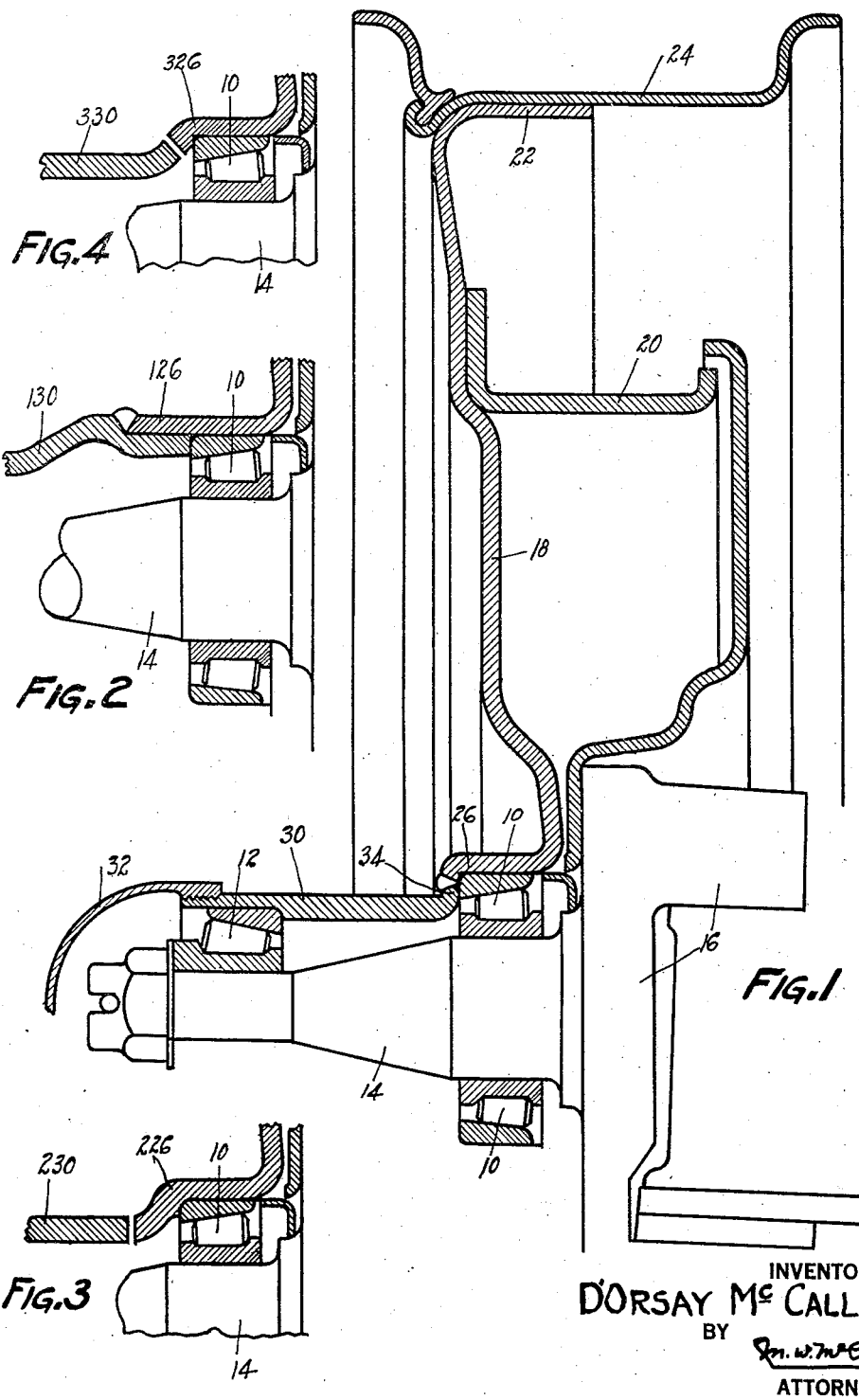
INVENTOR
D'ORSAY Mc CALL WHITE
BY
ATTORNEY Patented Jan. 14, 1930

1,743,644

UNITED STATES PATENT OFFICE

D'ORSAY McCALL WHITE, OF CHICAGO, ILLINOIS

MANUFACTURE OF WHEELS

Application filed October 14, 1925. Serial No. 62,473.

This invention relates to wheels, and is illustrated by showing a front disk wheel for an automobile. An object of the invention is to lessen the cost of a wheel of this general character by providing a hub in one piece with the wheel, while at the same time avoiding any loss of strength in the hub, by welding a separate half-hub part to a central tubular half-hub flange integral with the wheel disk. Preferably the integral flange, which is short enough so that it may be quite heavy, receives an anti-friction bearing which takes all the load of the wheel, the wheel being dished if necessary to bring the load plane in line with the bearing.

In the particular wheel illustrated, the dished disk is flanged inwardly at its outer edge (e. g. to support the rim), and the desired position of the load plane is secured by bringing the end of the integral half-hub flange substantially into the plane of the outer part of the disk.

Other features of the invention relate to novel and important details of the positioning means for the bearings, and to various other improvements which will be apparent from the following description of several constructions shown in the accompanying drawings, in which:

Fig. 1 is a vertical section through the upper half of one front wheel and associated parts; and Figs. 2, 3, and 4 are corresponding sections, taken at the hub only, of differently-modified wheels.

The wheel of Fig. 1 is mounted on an inner anti-friction bearing 10 and an outer bearing 12, on the spindle 14 of the front wheel knuckle 16. The wheel includes a disk 18, to which may be welded or otherwise secured a brake drum 20, and which has an inwardly extending flange 22 at its outer edge to receive a demountable tire-carrying rim 24.

At its center the disk is drawn outwardly to form a tubular half-hub flange 26 receiving the bearing 10, and shown turned inwardly at its end to form a positioning shoulder engaging the side of the bearing. The wheel disk 18 is dished in such a manner that the end of the flange 26 is substantially in the plane of the outer part of the disk, thus bringing bearing 10 into the load plane of the wheel.

By making the flange 26 relatively short, as shown, it may be made strong and heavy without requiring a thick extra mass of metal at the center of the disk, thus permitting the use of ordinary heavy sheet metal. The wheel is preferably rolled to reduce the thickness of the metal somewhat as it approaches the rim.

A separate tubular half-hub 30, threaded to receive a hub cap 32, is turned outwardly at its inner end to form a flange 34 registering with and welded to the end of flange 26, the out-turned flange 34 being shown in engagement with the side of bearing 10, additionally to position the bearing. At its outer or unwelded end, this half-hub is bored out to form a seat and a positioning shoulder for the bearing 12, the principal function of which is to take the side thrust of the wheel.

In the modification of Fig. 2, the half-hub member 130 is rabbetted out to fit inside of the end of flange 126, to form the entire positioning shoulder engaging the side of bearing 10, and is welded to the flange in the same manner as before. In the modification of Fig. 3, flange 226 is carried on out into a short cylindrical end, against which the end of the half-hub 230 is fitted, thus permitting the joint to be made by butt-welding. In Fig. 4, the flange 326 and the half-hub 330 have their inwardly and outwardly turned ends inclined at about 45°, so that they meet square, thus permitting butt-welding.

It should be noted that none of the load on the wheel comes on the weld, all being taken by bearing 10 and therefore by the integral flange 26, 126, 226, or 326. The side thrust on the wheel, which may be regarded as acting about a fulcrum in bearing 10 on a lever arm equal to the distance between the bearings 10 and 12, in no case imposes any shearing strain directly across the weld. In Fig. 1 the strain is at right angles to the weld, and this is nearly true in Fig. 4; in Fig. 2 the parts overlap; Fig. 3 shows a construction in which at times a part of the weld only may be under shearing strain. In all cases, since the weld is nearly at the base of the hub, the mechanical advantage of the side thrust in acting on the weld is reduced to a minimum.

While several illustrative constructions have been described in detail, it is not my intention to limit the scope of the invention to those particular constructions, or otherwise than by the terms of the appended claims. The drum 20, if desired, may form a part of the wheel, as in Siddeley Patent No. 1,439,269.

I claim:

1. That method of making a one-piece hub and wheel disk part which comprises drawing a flange in one direction at the outer edge of a blank disk and drawing a short tubular flange in the opposite direction at the center of the disk, forming the tubular flange to receive an anti-friction bearing and providing it with a bearing-position shoulder at the end opposite the junction of the flange and the disk, and welding to the end of the tubular flange a tubular member having a seat and positioning shoulder for another bearing.

2. That method of making a one-piece hub and wheel disk part which comprises drawing a short tubular flange outwardly at the center of a blank disk, forming the tubular flange to receive an anti-friction bearing and providing it with a bearing-position shoulder at the end opposite the junction of the flange and the disk, and welding to the end of the tubular flange a tubular member having a seat and positioning shoulder for another bearing.

3. A disk wheel having an integral short outwardly-extending tubular flange forming a half-hub at its center, and a separate tubular half-hub welded to the end of the tubular flange.

4. A disk wheel having an integral inwardly-extending substantially cylindrical flange at its outer edge and a short outwardly-extending tubular flange forming a half-hub at its center, and a separate tubular half-hub welded to the end of the tubular flange, the disk being dished to bring the outer part of the disk approximately into the plane of the welded joint between the tubular flange and the separate half-hub.

5. A disk wheel having an integral short outwardly-extending tubular flange forming a half-hub at its center, and a separate tubular half-hub welded to the end of the tubular flange, the disk being dished to bring the outer part of the disk approximately into the plane of the welded joint between the tubular flange and the separate half-hub.

6. A disk wheel having a short integral outwardly-extending tubular half-hub flange at its center provided adjacent its free edge with an internal shoulder to position an anti-friction bearing in the flange, and a separate tubular half-hub welded to the free edge of said flange substantially beyond said bearing.

7. A disk wheel having a short integral outwardly-extending tubular half-hub flange at its center provided adjacent its free edge with an internal shoulder to position an anti-friction bearing in the flange, and a separate tubular half-hub welded to the free edge of said flange and having a shoulder at its welded end engaging and positioning the same bearing, the flange being turned inwardly at its end to form its shoulder and the half-hub being turned outwardly at its end to form its shoulder, the two shoulders registering and being welded together.

8. A disk wheel having a short integral outwardly-extending tubular half-hub flange at its center, and a separate tubular half-hub welded to the end of the flange and forming a shoulder facing toward the disk and positioning a bearing seated in the flange.

9. A disk wheel having an outer rim-carrying part and a central integral bearing-receiving half-hub flange, the wheel being dished to bring the bearing into the plane of the load, in combination with a separate tubular half-hub welded to said flange beyond the bearing.

10. A disk wheel having an outer rim-carrying part and a central integral bearing-receiving half-hub flange, the wheel being dished to bring the bearing into the plane of the load, in combination with a separate tubular half-hub welded to said flange beyond the bearing and formed to receive a second bearing in its free end, the second bearing being spaced a substantial distance outwardly of the load plane.

11. A disk wheel having an outer rim-carrying part and a central integral bearing-receiving half-hub flange, the wheel being dished to bring the bearing into the plane of the load, in combination with a separate tubular half-hub welded to said flange beyond the bearing, the thickness of the disk being greater at the central part than at the outer rim-carrying part.

12. A method of making a one-piece hub and wheel disk part comprising rolling a disk blank so that the outer portion of the disk will be of less thickness than the inner portion, drawing a short tubular flange outwardly at the center of the thick portion of the blank disk, forming the tubular flange to receive an anti-friction bearing and providing it with a bearing-position shoulder at the end opposite the junction of the flange and the disk, and welding to the end of the tubular flange a tubular member having a seat and positioning shoulder for another bearing.

In testimony whereof I have hereunto signed my name.

D'ORSAY McCALL WHITE.